United States Patent

Kohaut

[11] 4,099,020
[45] Jul. 4, 1978

[54] APPARATUS FOR SEALING PASSAGES THROUGH A CONCRETE FLOOR AND ABOUT A CONDUCTOR

[75] Inventor: John E. Kohaut, West Orange, N.J.

[73] Assignee: Raceway Components, Inc., Nutley, N.J.

[21] Appl. No.: 745,791

[22] Filed: Nov. 29, 1976

Related U.S. Application Data

[63] Continuation-in-part of Ser. No. 436,500, Jan. 25, 1974, Pat. No. 3,995,102.

[51] Int. Cl.$^2$ ............................................. A62C 3/16
[52] U.S. Cl. ........................................ 174/48; 106/75; 169/48
[58] Field of Search ................. 169/48, 49; 174/48, 174/57; 252/378 R; 106/75

[56] References Cited

U.S. PATENT DOCUMENTS

| | | | |
|---|---|---|---|
| 2,279,791 | 4/1942 | Lamb | 169/48 |
| 3,336,153 | 8/1967 | Juda | 220/88 R X |
| 3,455,850 | 7/1969 | Saunders | 252/378 R X |
| 3,803,341 | 4/1974 | Klinkman et al. | 174/48 |
| 3,933,514 | 1/1976 | Banks | 106/75 |

*Primary Examiner*—Joseph F. Peters, Jr.
*Assistant Examiner*—Michael Mar

*Attorney, Agent, or Firm*—Sommers & Sommers

[57] ABSTRACT

This invention relates to an apparatus for sealing a passage through a concrete floor and about a conductor, such as an insert device for cables adapted to be positioned in structural openings, such as, for example in holes drilled into or formed in floors and other planar surfaces of structures such as buildings, to facilitate connection of power lines, cables and wires from a source into a cable receiving junction box at the underside of the floor and through the insert device and thence to a service head at the upper face of the floor, for connection of various accessory devices thereto, a fire retardant hollow member, comprised of water-containing alkali metal silicate, being provided to seal the device in the floor opening and to seal the cables therein, automatically foaming to effectuate the sealing action described, on occurrence of fire or excessive temperatures, to effectively so seal the assembly. The cables on such occurrence, are thus sealed in the insert device in air-tight, spaced relation to each other; spread of fire and excess heat therethrough will be automatically prevented, and the fire protection rating of the floor wherein the insert device is so mounted and used will be substantially equivalent to the original rating of the floor.

2 Claims, 3 Drawing Figures

APPARATUS FOR SEALING PASSAGES THROUGH A CONCRETE FLOOR AND ABOUT A CONDUCTOR

BACKGROUND OF THE INVENTION

This application is a continuation-in-part of application Ser. No. 436,500 filed on Jan. 25, 1974 now Pat. No. 3,995,102.

This invention generally relates to an apparatus for sealing a passage through a concrete floor and about a conductor, such as cable conduit devices and more particularly to inserts for use in connection with concrete and other floors, for passage of power, telephone, signal and other cables from a junction box to a service head, facilitating easy connection of telephone, electrical and other apparatus thereto. Various forms of cable conduits have been proposed and are in use; such devices are objectionable for a number of reasons. In one form of such device, nipples are run through the outlet box and into the service fitting. In the case of fire, the nipples act as a raceway for heat and flame. For large diameter conductors, such prior devices were objectionable in that the insulation about such conductors would burn off in a fire, leaving a passage for heat through the insulation. Prior devices have been further objectionable in that they have not met the requirements of underwriters and local building requirements as they did not provide effective heat and flame barriers, would not operate at high temperatures, and constituted a serious fire hazard.

The device of this invention overcomes the foregoing and other objections to devices of the prior art and further provides features of construction and adjustment enabling the device to be manufactured in standard form adaptable for use in openings of various depths. In pre-set and after-set applications the device may be used with assurance that it will completely and effectively seal and fireproof cables passed therethrough as well as the floor opening wherein the device is positioned, against passage excess heat and flames. The outlet box and service head in the device of the invention are connectable adjustably to conform to varying depths and thickness of openings in the floors, in a simple and highly efficient, rugged and durable manner.

DESCRIPTION OF THE DRAWINGS

The invention is diagrammatically illustrated, by way of example, in the appended drawings, wherein similar reference characters indicate like parts and wherein.

DESCRIPTION OF THE PREFERRED EMBODIMENT

Figure 1:
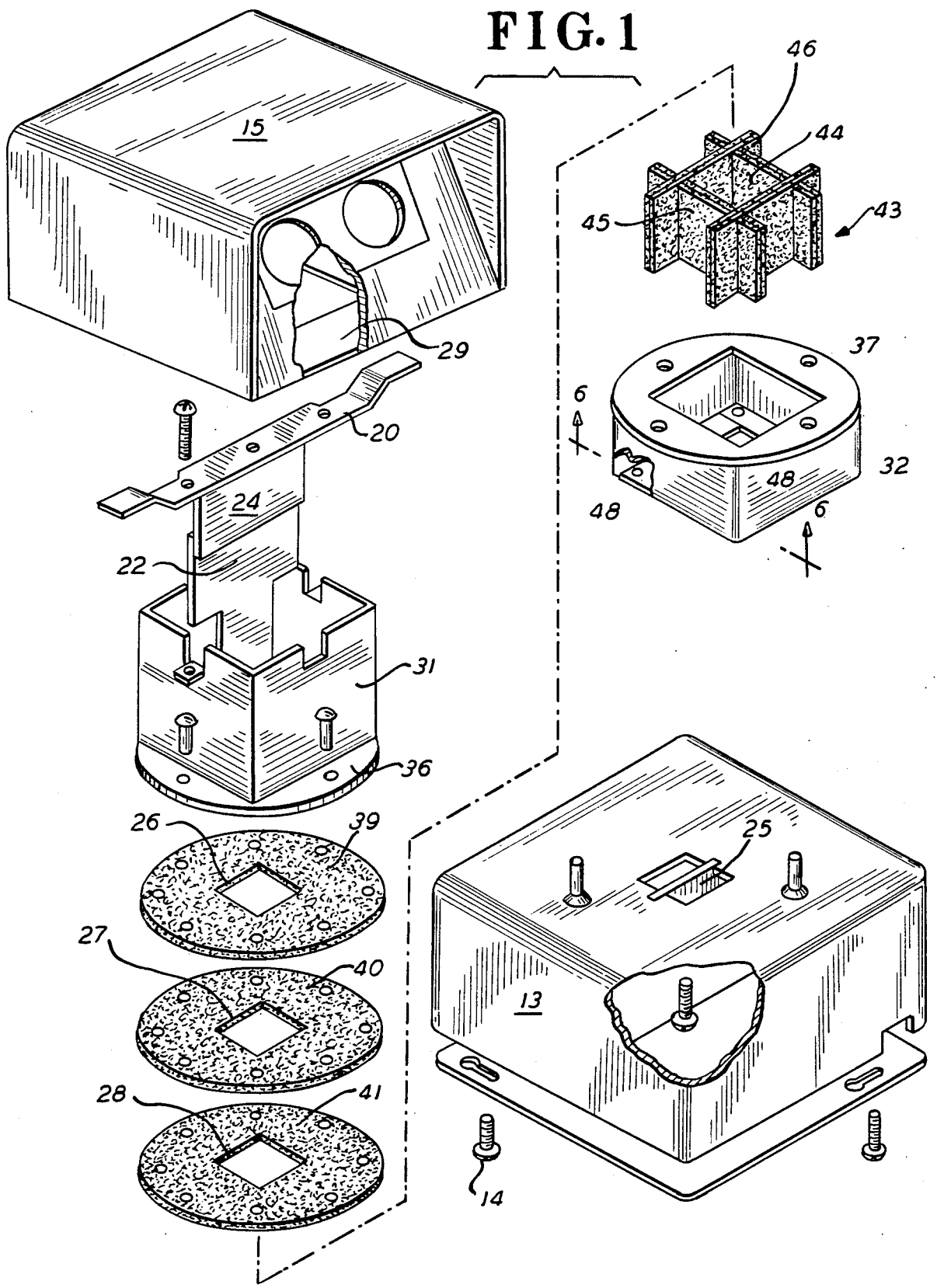
FIG. 1 is an exploded, partly fragmentary perspective view of an apparatus for sealing a passage through a concrete floor and about a conductor, such as an insert device for conduits embodying the invention, with the parts thereof shown positioned intermediate the junction box and service head.
Figure 2:
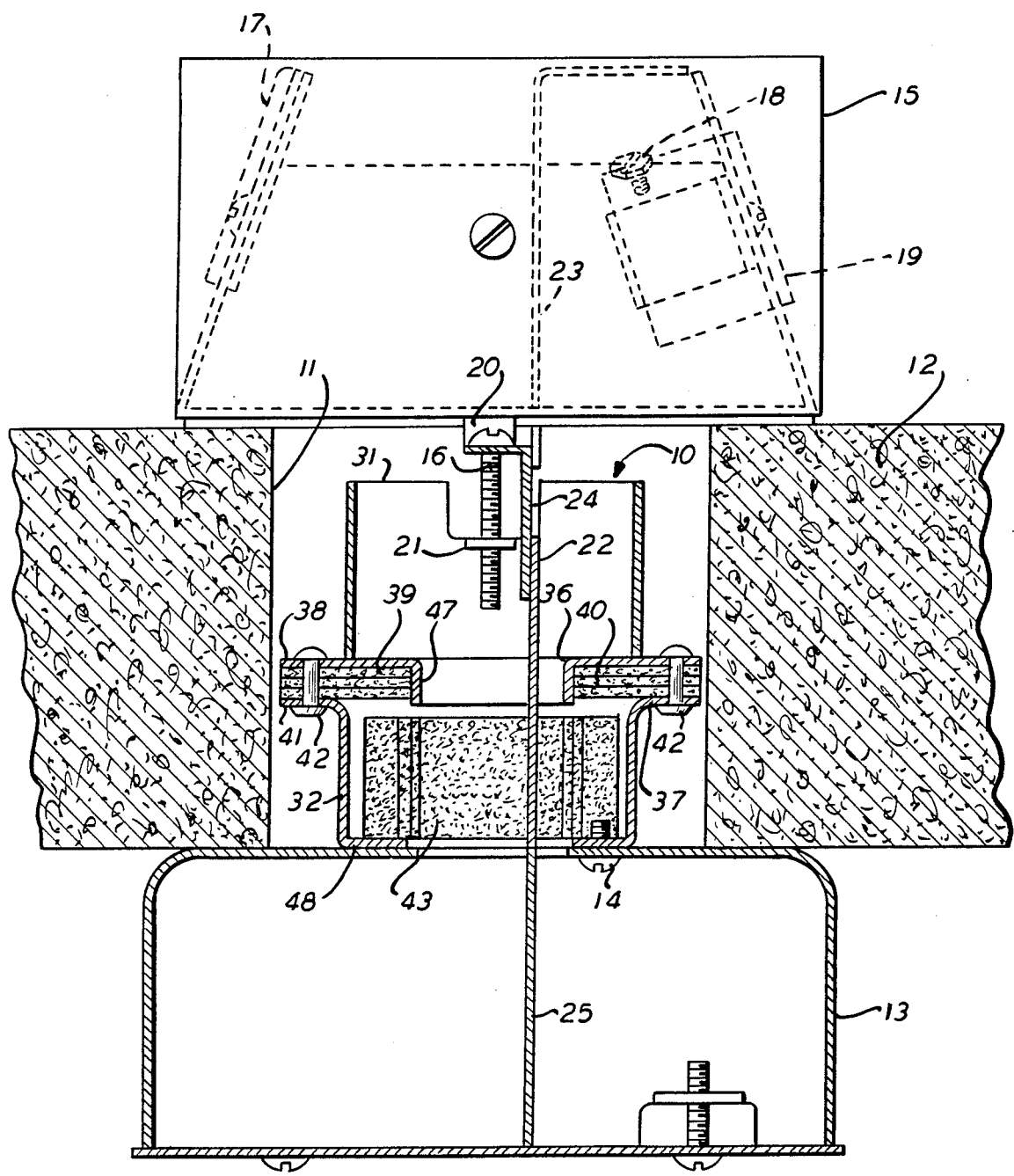
FIG. 2 is a vertical sectional view of a structural opening in which the device embodying the invention is shown positioned with the junction box and service head shown disposed against and in closing relation to the opposite faces thereof.
Figure 3:
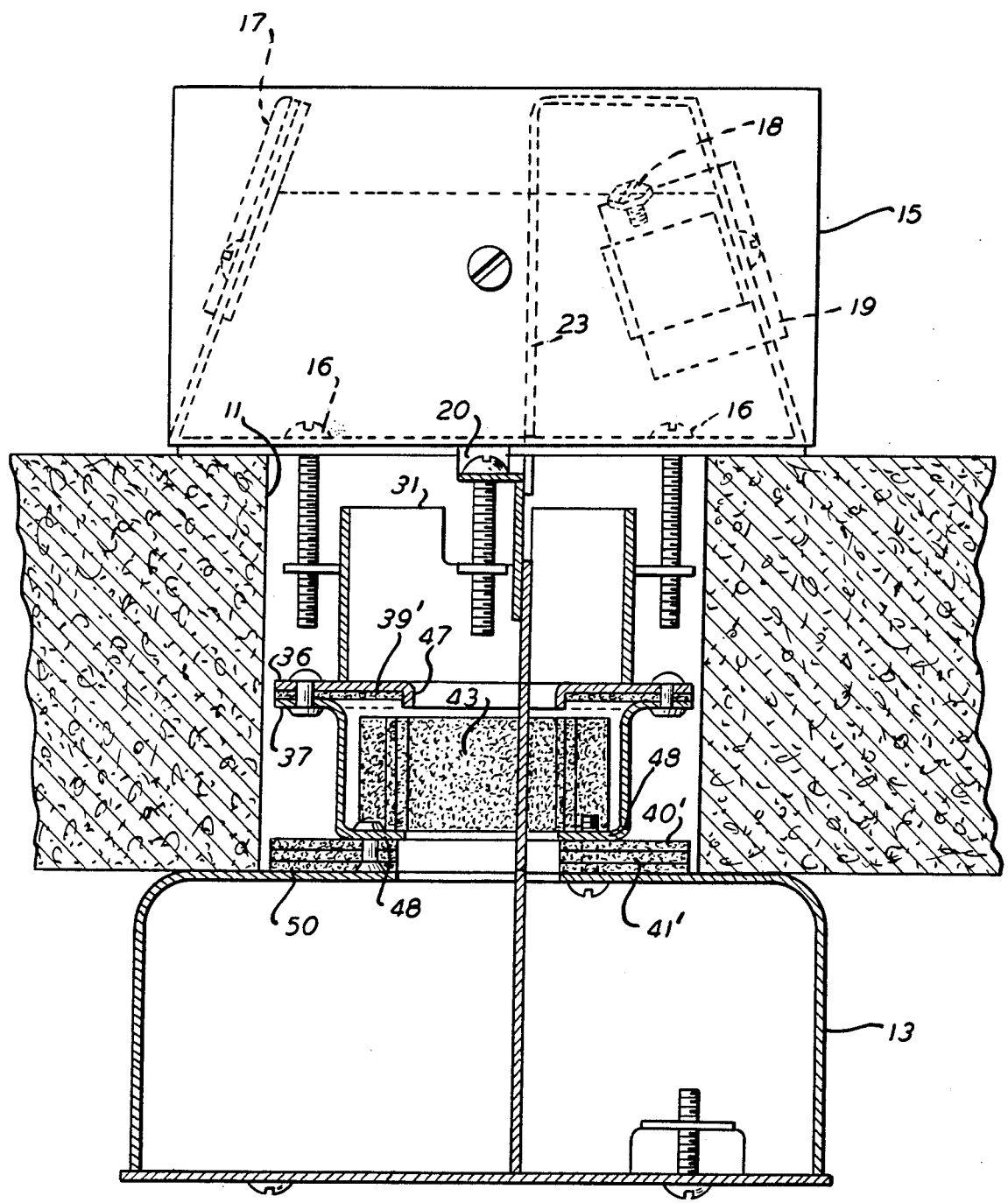
FIG. 3 is a similar view of another form thereof.

The invention comprises an apparatus for sealing a passage through a concrete floor and about a conductor, such as an insert device 10 adapted (FIG. 2) to be positioned in a structural opening, such as the opening 11 in structure 12, which may be a floor, for example, in a building, said floor being formed by any suitable means, such as by setting of hardening material in forms in which the insert device 10 may be positioned in the "preset" form in initial construction, within a suitable waterproofing envelope in the floor so formed. The insert device 10 serves the function of providing a means for passage of cables, wires and the like through a junction box 13, which may be connected to the insert device by suitable bolt or other means 14 (FIG. 2) said cables or wires passing upwardly through the insert device and into a service head 15, which may be connected to the insert device by suitable means such as bolts 16. The cables or wires may thus be passed through the junction box 13 from a remote source and thence through the insert device and to the service head, where the cables may be connected as by means of the posts 18 to receptacles in the service head or passed through grommets or other openings 17 (FIG. 2) in the service head; they may be electrically connected to receptacles or other plug receiving members 19 (FIG. 3). The insert device may be directly or indirectly connected to the service head by suitable means, for example, by a strap bar 20 (FIGS. 1 and 2) for receiving bolts and other means to connect the insert device flanges 21 (FIG. 2) or other internally threaded or other complementary connector means in the insert device 10 and to flanges 29 (FIG. 1) of the service head. The insert housing is provided with an upstanding barrier 22 (FIGS. 1 and 2) which may be secured thereto in any desired or convenient manner and the service head may be provided with a depending barrier 23 (FIG. 1) for complementary sliding registration (FIG. 2) with the barrier segment 24 depending from the strap bar 20 also complementing the barrier 22 in the insert device 10. The junction box 13 may be provided with a barrier 25 for endwise abutting or other registration with the barrier 22 when the parts are assembled (FIG. 2) thus providing an essentially continuous barrier (FIG. 2) 25, 22, 24 and 23 throughout the adjustable range of the parts. The insert device 10 (FIG. 1) may be formed with a continuous tubular wall member comprising of upper and lower sections 31, 32 provided with flanges 36, 37 for connection by bolts or other axially adjustable connectors, to facilitate connection of the parts and adjustment thereof to accommodate use thereof in structural openings, such as shown at 11 (FIG. 2). The barriers above described divide the insert device, junction box and service head into compartments in which different use-serving or kinds of wire or cables — for example, high and low voltage wires - may be respectively passed in separately shielded and isolated electrical or otherwise relation. The FIG. 2 form of the invention is an "after set" form wherein the device is provided with means for fire retarding the device in opening 11. In that form upper and lower insert device sections 31, 32 are provided with complementarily formed flanges 36, 37, fire retarding means being positioned therebetween. Said fire retarding means such as a hollow member, comprised of a water-containing alkali metal silicate, may (FIGS. 1 and 2) comprise discs or plates 39, 40, 41 positioned intermediate the sections of the device (FIG. 2) by bolt or other means 42. In the case of fire or elevated temperatures the fire retarding discs foam and expand into the aperture 11, sealing the same and thereby effectively preventing flame or elevated temperatures from passing through. This important automatic fire prevention feature of the invention prevents passage of fire or elevated temperatures through the floor of the structure in which the insert device is positioned. The fire retarding discs are preferably made of material which will automatically expand and foam under pressure when exposed to fire or to substantially highly elevated temperatures. A material we have found highly suitable for that purpose is water-containing alkali metal silicate, which foams and creates tremendous pressures on occurrence of fire or higly elevated temperatures, and which is operable up to 2000° F, the foam flowing into all voids between the insert device in the floor and providing a barrier, effectively preventing the passage of flame and excess temperatures therethrough. At about 200° C., the water-vapor escapes, to leave a solid, fine-porous, uncracked and thermally insulating layer of foamed material, having a density of 0.1 to 0.2 g/m$^3$.

A further feature of the invention comprises providing a fire retarding member 43 such as an elongated hollow member, comprised of water-containing alkali metal silicate, (FIGS. 1 and 2) of criss-cross section, defining therein parallel passageways 44, 45 and 46, for passage therethrough of cables in aligned relation to the other parts of the device as above described. To that end the opening 44 of cable passage fire retarding member 43 is in alignment with opposite sides of the barrier 22 with which a plurality of discs such as 39, 40, 41 may have registration engagement on assembly of the device (FIG. 2). For further alignment of the parts the upper ction 31 of the insert device is preferably provided with a medially formed downwardly flared depending rim 47 (FIG. 2) with which the discs 39, 40, 41 may have registration engagement. The member 43 may be positioned on flanges 48 (FIGS. 1 and 2) inwardly depending from the bottom of the plate or section 32 of the insert device (FIGS. 2 and 3) and defining an opening for the passage of cables and wires.

As shown in FIG. 2, the fire retarding member 43 may be positioned on said rim 48 of the lower section 32 of the insert device 10 and the cables passed therethrough; upon occurrence or highly elevated temperatures, the fire retarding member 43 will expand and foam and exert substantial pressure, and will fill the spaces between and around the cables, including large diameter cables with respect to which such pressure from such member will fill the space left when the insulation burns off, and will fill the interior of the insert device, forming an essentially solid and closed lower section 32 in the insert device, which will retard passage of excess heat or fire therethrough. The material of which the fire retarding member 43 may be made may be water-containing alkali metal silicate having the properties above described in connection with the discs 39, 40, 41 which further seal the opening 11. In the form shown in FIG. 3 a single disc 39' (instead of the plurality) is used intermediate the flanges 36, 37 of the lower and upper sections of the insert device. If desired, further discs 40', 41' foaming and expanding upon the occurrence of heat, fire or elevated temperatures, may (FIG. 3) be positioned intermediate the disc 50 and flanged rim 48 of the lower section of the insert device, to further seal the insert device in the opening 11. While I have shown the fire retarding member 43 of open web, criss-cross, cross section, for simplicity of manufacture assembly and use it may be of that or any other desired or convenient contour or cross sectional configuration; the number of passegeways provided therein likewise may be varied to conform to the requirements of particular uses, as may also the number of barriers and their position in the insert device 10 for the uses and purposes above described. A disc 50 (FIG. 3) may be positioned intermediate the insert device and the junction box 13 and may be provided with an upstanding registration hub 51 which may be equal to or of smaller cross section than the medial opening in 44 of member 43. The fire retarding discs 39, 40, 41 may (FIG. 1) be provided with medial apertures 26, 27, 28 for passage of cables and wires etc. therethrough. Disc 50 may be metal or other suitable material. The water-containing alkali metal silicate preferably contains between 20 and 70 percent by weight of water, and includes fibers, such as glass fibers, in a form such as chopped strands.

While the invention has been set forth above in terms of a specific embodiment thereof, it is to be understood that variations therein may be made by those skilled in the art, which variations may nevertheless be within the scope and spirit of the invention. In view thereof, the invention is to be broadly construed within the scope and spirit of the claims appended hereto.

I claim:

1. An insert device and apparatus for sealing passages through a floor, upon occurence of fire or excess temperatures, in a substantially solid structural member, said structural member having an opening formed therein and therethrough perpendicularly to the longitudinal axis thereof, said insert device being adapted to be positioned in said opening, whereby cables may be passed through said insert device, and thereby through said structural member, said insert device comprising:

an insert housing proportioned to be so perpendicularly positioned in said opening in the structural member, said insert housing including a wall member defining a continuous cable-receiving opening therein, said wall member proportioned to be snugly positioned in said vertical opening in the structural member, plate means in said housing positioned in said housing wall intermediate the length thereof and second plate means positioned at the lower end of said wall member, said plate means having registering apertures therein for passage therethrough, and thus through the structural member, of cables, an elongated hollow, cable-passage, fire-retarding member positioned on the second plate means and intermediate both plate means in alignment with said apertures therein, said fire retarding means formed of material enabling passage of cables therethrough at normal room temperatures, but automatically expanding and closing the opening therethrough and in said wall member and sealing the cables therein on occurence of excess heat or fire, thereby sealing the housing and said structural member opening.

2. In an insert device and apparatus for sealing passages through a floor upon occurence of fire or excessive temperatures, as set forth in claim 1, said plate means in said housing, so secured to the wall member intermediate the length thereof, being medially downwardly flared to so define a flared apertured portion therein in registry with the fire retarding means, for aligned passage of cables through the fire retarding means and through the insert device, at normal room temperatures.

* * * * *

REEXAMINATION CERTIFICATE (412th)
United States Patent [19]

Kohaut

[11] B1 4,099,020

[45] Certificate Issued    Nov. 5, 1985

[54] APPARATUS FOR SEALING PASSAGES THROUGH A CONCRETE FLOOR AND ABOUT A CONDUCTOR

[75] Inventor: John E. Kohaut, West Orange, N.J.

[73] Assignee: Raceway Components, Inc., Nutley, N.J.

Reexamination Request:
No. 90/000,633, Sep. 21, 1984

Reexamination Certificate for:
Patent No.: 4,099,020
Issued: Jul. 4, 1978
Appl. No.: 745,791
Filed: Nov. 29, 1976

Related U.S. Application Data

[63] Continuation-in-part of Ser. No. 436,500, Jan. 25, 1974, Pat. No. 3,995,102.

[51] Int. Cl.⁴ ............................................. A62C 3/16
[52] U.S. Cl. ....................................... 174/48; 106/75; 169/48

[56] References Cited

U.S. PATENT DOCUMENTS 3,864,883   2/1975   McMarlin ............................ 52/221

*Primary Examiner*—A. T. Grimley
*Assistant Examiner*—D. A. Tone
*Attorney, Agent, or Firm*—Howard N. Sommers

[57]          ABSTRACT

This invention relates to an apparatus for sealing a passage through a concrete floor and about a conductor, such as an insert device for cables adapted to be positioned in structural openings, such as, for example in holes drilled into or formed in floors and other planar surfaces of structures such as buildings, to facilitate connection of power lines, cables and wires from a source into a cable receiving junction box at the underside of the floor and through the insert device and thence to a service head at the upper face of the floor, for connection of various accessory devices thereto, a fire retardant hollow member, comprised of water-containing alkali metal silicate, being provided to seal the device in the floor opening and to seal the cables therein, automatically foaming to effectuate the sealing action described, on occurrence of fire or excessive temperatures, to effectively so seal the assembly. The cables on such occurrence, are thus sealed in the insert device in air-tight, spaced relation to each other; spread of fire and excess heat therethrough will be automatically prevented, and the fire protection rating of the floor wherein the insert device is so mounted and used will be substantially equivalent to the original rating of the floor.

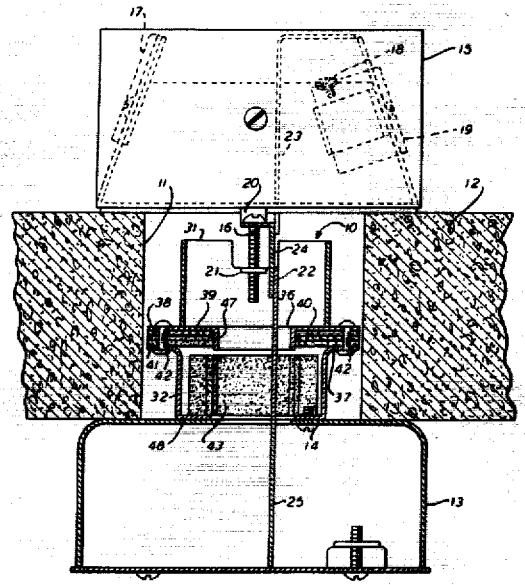

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 and 2 is confirmed.

* * * * *